(12) United States Patent
Milstein et al.

(10) Patent No.: US 7,756,539 B2
(45) Date of Patent: Jul. 13, 2010

(54) PUSH-TO-TALK EVENT NOTIFICATION

(75) Inventors: David Milstein, Redmond, WA (US); Linda Criddle, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 11/140,461

(22) Filed: May 27, 2005

(65) Prior Publication Data

US 2006/0270430 A1    Nov. 30, 2006

(51) Int. Cl.
*H04B 7/00* (2006.01)

(52) U.S. Cl. .................... 455/518; 455/517; 455/519; 455/520

(58) Field of Classification Search .......... 455/517–520
See application file for complete search history.

(56) References Cited

U.S. PATENT DOCUMENTS

| | | | | |
|---|---|---|---|---|
| 4,996,707 | A * | 2/1991 | O'Malley et al. | 379/100.13 |
| 6,430,604 | B1 * | 8/2002 | Ogle et al. | 709/207 |
| 6,714,635 | B1 * | 3/2004 | Adams et al. | 379/204.01 |
| 6,763,226 | B1 | 7/2004 | McZeal, Jr. | |
| 2002/0111846 | A1 | 8/2002 | Singer | |
| 2004/0202117 | A1 * | 10/2004 | Wilson et al. | 370/310 |
| 2004/0249949 | A1 | 12/2004 | Gourraud et al. | |
| 2006/0148467 | A1 * | 7/2006 | Kreitzer et al. | 455/426.1 |

OTHER PUBLICATIONS

Winplanet, www.winplanet.com, "Push2Talk, ICQ, Xtraz, dual screen support, image gallery . . . ", http://www.winplanet.com/whatsnew/197.htm, Feb. 28, 2005.
Pocket Download, www.pocketdownload.com, "Multimedia", http://www.pocketdownload.com/pages/UIQ/Entertainment/Multimedia/index.php, Feb. 28, 2005.
Univers Mobile, www.universmobile.net, "Mobile Phones", http://64.233.167.104/search?q=cache:Zn8FHdAYoFIJ:universmobile.net/all/search.php%3Fctg%3D18%26to%3D1%26pgi%3D1+push2talk+mobile+phones+universmobile&hl=en, Feb. 28, 2005.
Nokia, www.nokia.com, "Nokia Business Email Solutions", http://www.nokia.com/nokia/0,8764,65248,00.html, Sep. 6, 2005.

* cited by examiner

*Primary Examiner*—Patrick N Edouard
*Assistant Examiner*—Shantell Heiber
(74) *Attorney, Agent, or Firm*—Vierra Magen Marcus & DeNiro LLP

(57) ABSTRACT

A method and system for notifying a push-to-talk enabled user of an event. The method includes the steps of: receiving event data to be provided to a user; determining a push-to-talk configuration including carrier information for the user; and based on the push-to-talk configuration, providing the event data and user identification information to a carrier identified in the carrier information. The system may include an aggregation service controller; a text to speech converter; a user PTT connection mapping database; an online service interface; and a PTT service provider interface.

18 Claims, 7 Drawing Sheets

PUSH-TO-TALK EVENT NOTIFICATION

BACKGROUND OF THE INVENTION

1. Field of the Invention

The present invention is directed to providing individuals with mobile access to events generated by online services via push-to-talk devices.

2. Description of the Related Art

People increasingly rely on electronic messaging and notification services to communicate and manage information. Online service providers such as MSN®, Yahoo® and AOL® allow individuals having accounts with their service to receive and send email, store contact and calendar information, communicate through instant messaging services, and receive and generate reminders for events. The increasingly mobile nature of users, and the diverse nature of mobile devices, makes providing mobile users with access to online services and other electronically stored information difficult.

Mobile devices can include personal digital assistants (PDAs), laptop computers, cellular phones, or other wireless devices, such as "smart" phones. Wireless devices, including some PDA's and cellular phones, can access information from online service providers or other host systems. Normally, such devices require specific application programs or a World Wide Web interface to gain access to the online service information of the user. The Web interface provided by such mobile devices is often much more limited than a standard desktop computer Web browser. Online web services have difficulty reaching service subscribers who are not using a desktop computer since web applications for online service provides do not operate well on the limited web interface of mobile devices. Many online service providers build data connectivity interfaces to cellular networks and develop client side applications for mobile devices. However, the effort of deploying data connectivity based clients onto mobile devices is difficult due to slow penetration of smart phones, many users reluctance to use non-voice features of their phone, and the difficulty of porting web-service enabled client applications to mobile devices due to variety of mobile-devices operating systems and programming environments.

Reminder messages can also be sent through messenger services, such as MSN® Messenger, Yahoo® Messenger, and AOL® messenger. However, reminders sent through these services must be accessible to the messenger service provider. Each of the aforementioned providers generally has access only to users who have enabled accounts with a corresponding service provider who stores content for the user. Hence, a user who stores information with one service must use that services' corresponding messenger service to provide reminders through this mechanism.

While some online services have experimented with providing audio based interfaces, such interfaces are generally slow and difficult for users to interact with. They use voice recognition technology to allow users to respond to audio prompts allowing the user to, for example, have email read to them after phoning into the service.

Push-to-talk, commonly abbreviated as PTT, is a method of conversing on half-duplex communication lines, by pushing a button in order to send voice communication from one's device, and releasing the button to receive voice communication. While PTT is a feature that is available on certain cellular phone models, the feature has expanded to use in messenger and voice-over-IP applications. Indeed, the feature can conceivably be enabled on any communications network.

In the mobile environment, PTT allows a mobile phone to function as a digital two-way radio in push-to-talk operation. Currently, PTT users must to belong to the same mobile operator's (carrier's) network. Current providers include Nextel® Communications, Verizon® Wireless and Sprint® PCS in the United States. Each service uses a different technology. Nextel uses Integrated Digital Enhanced Network (iDEN) technology which combines communications and telephony systems in a single device. Verizon's service runs over a CDMA 1xRTT high speed data network and is based on voice-over-IP.

The PTT market, both for wireless and non-wireless communications is growing. A means for providing access to user information via PTT would be useful.

SUMMARY OF THE INVENTION

The present invention, roughly described, pertains to using web technology and text-to-voice conversion mechanisms to provide online service content, in an audio format, directly to PTT enabled mobile devices of PTT subscribers. In one embodiment, the invention is a method for notifying a user of an event. The method includes the steps of: receiving event data to be provided to a user; determining a push-to-talk configuration including carrier information for the user; and based on the push-to-talk configuration, providing the event data and user identification information to a carrier identified in the carrier information In an alternative embodiment, the invention includes a notification event server. The notification event server may include an aggregation service controller; a text to speech converter; a user PTT connection mapping database; a online service interface; and a PTT service provider interface.

In another embodiment, the invention is a method for providing an online service. The method may include the steps of providing a online service interface to receive event data to be provided to a user; maintaining a push-to-talk configuration including carrier information for the user; and upon receiving an event and based on the push-to-talk configuration, outputting the event data and user identification information to a carrier identified in the carrier information.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

The invention uses web technology and text-to-voice conversion mechanisms to provide online service content, in an audio format, directly to PTT enabled mobile devices of PTT subscribers. PTT provides a unique, user centric mechanism for reaching users in a convenient fashion since it does not require complex user interaction with the device to access information. In one embodiment, an online service subscriber can register PTT subscription information with an online service as a contact point for the subscriber. When the online service seeks to contact the subscriber with a notification event (such as a reminder), it will ensure the notification is in an audio format, converting text to voice if necessary, and send a PTT notification to the subscriber. The subscriber will be notified of the event through a PTT enabled device and upon activating the device, the message will be played to the subscriber. By taking advantage of existing PTT infrastructure, the online service provider does not have to integrate with various devices and manufacturers, rather only the entry point into the network. As many phones today have PTT capabilities, the notification service can be made broadly available, and using a voice driven interface reduces the complexity of online service usage over a phone. The invention finds further applicability when used with other electronic services, such as when integrated with mail servers or when online service information is provided directly from PTT carriers.

Figure 1:
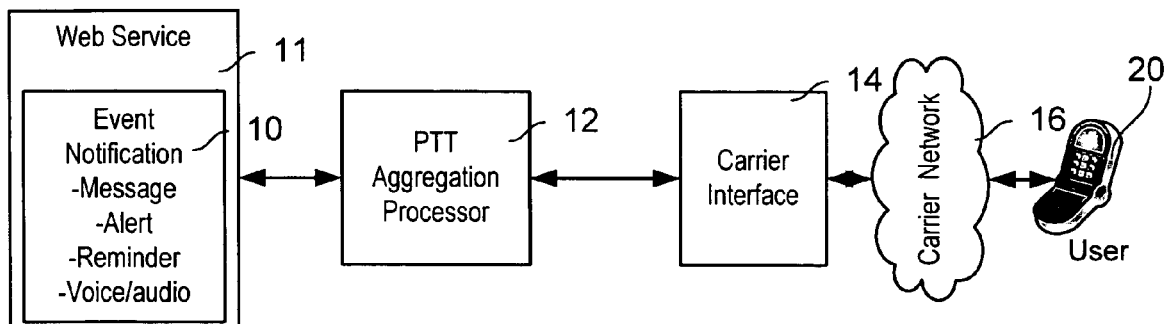
FIG. 1 is a block diagram of a system implementing one embodiment of the present invention.

FIG. 1 shows a basic block diagram of the systems which interact to provide a notification to a PTT user. FIG. 1 shows an online service provider system 11 which generates an notification event 10. The online service represented in FIG. 1 can be a web service, such as MSN®, Yahoo®, AOL® or the like, or can comprise any system storing information for an account holder and for which notification events, such as emails, instant messages (voice or text), voicemails, calendar reminders, stock quotes, sports scores, or the like, may be generated. If a user 20 has configured the online service 10 to do so, the online service 11 provides a notification event to a push-to-talk aggregation processor 12. In one embodiment, the online service providers such as those described above can operate the aggregation processor, or a separate entity can operate the aggregation processor 12 and collect events from multiple online service providers.

Aggregation processor 12 will receive the notification event and, if necessary, perform a text speech conversion. The aggregation processor determines which PTT carrier the user 20 subscribes to and how to contact the user via the PTT carrier. The contact information can be the user's phone number or other identifier which is utilized by the carrier API to identify the user within the carrier's PTT network. Once the PTT aggregation processor has determined where the user is, the event in a voiced format will be provided to the carrier application programming interface API 14. In this context, the term API refers to any carrier-provided access point for a push-to-talk system, and may comprise hardware, software, network interfaces and a command set to allow third parties to access the carrier's PTT system. Carrier API 14 can be any interface provided by the PTT carrier network provider which allows the message to be transferred via the carrier's network 16 to the user 20. Once provided to the interface 14, the PPT carrier transmits the notification event to the user via the carrier's protocol. The PTT aggregation processor 12 may comprise any of the embodiments of the processor device shown in FIGS. 4-7.

Figure 2:
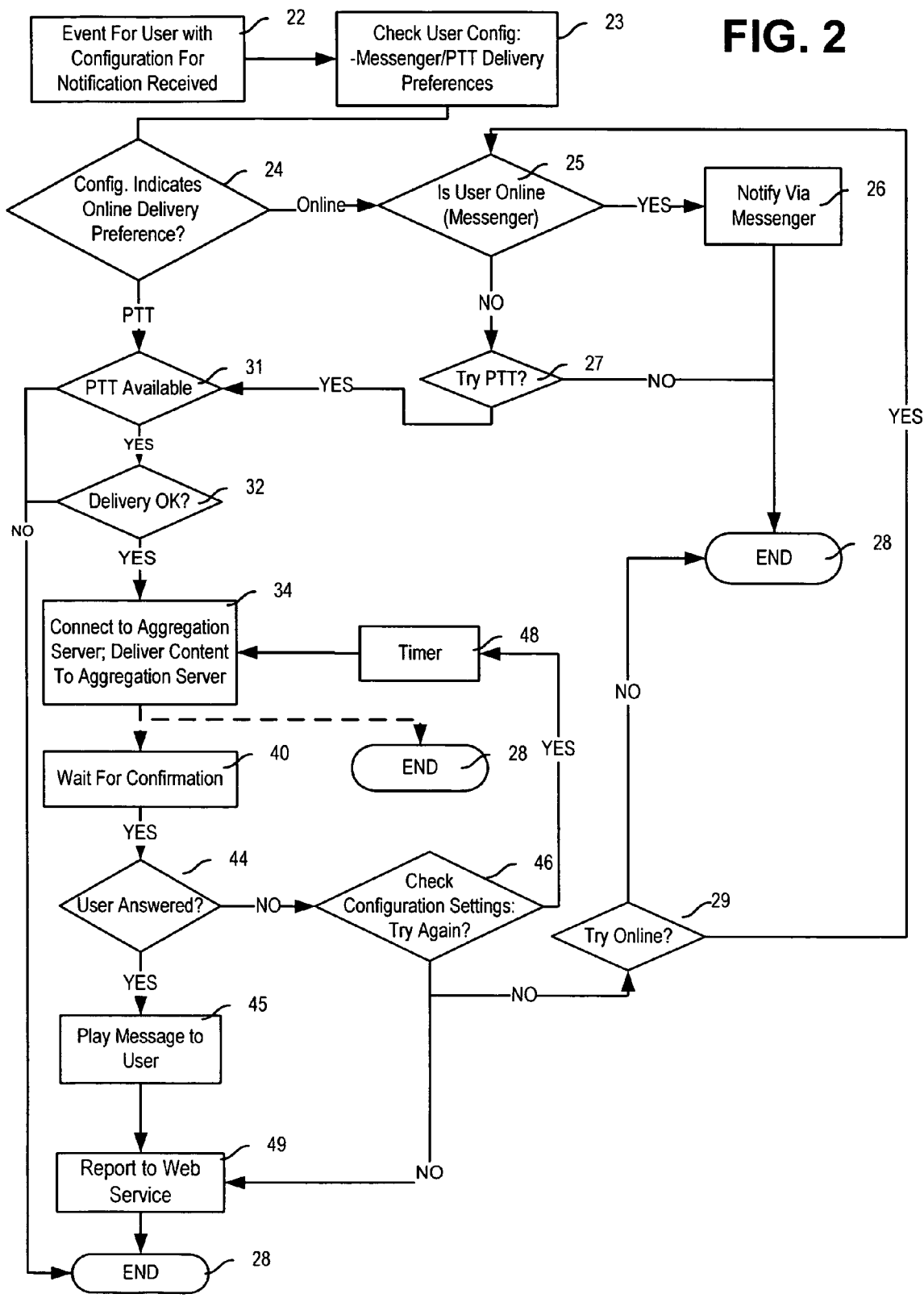
FIG. 2 is a flow chart illustrating a method performed by a online service in accordance with the present invention.

FIG. 2 is a flowchart of a method in accordance with the present invention which is performed by an online service provider 11 in order to provide event notifications to its members who are PTT subscribers. As will be discussed herein, the online service provider 11 must maintain certain information to allow the aggregation processor 12 to contact the user 20. Configuration information is provided via the online service provider and maintained by the online service provider to allow the aggregation processor to connect to the carrier. In one embodiment of the present invention, the online service provider will offer the user a configuration interface at sign-up time, or thereafter, in accordance with the user's account settings with the online service. Normally, a user account will include such things as the user's name, address, personal information, and other identifying characteristics which the user wishes to make available to the online service to provide additional services from the service to the user. In the configuration interface, the user may identify to the online service that the user has a PTT enabled device accessible through a particular carrier. Configuration information can include the user's carrier and contact information as well as information about the type of notification events for which the user wishes to be notified. Once configuration information is input by the user, it is stored in the online service and operated on in accordance with the discussion herein.

In a further aspect of the present invention, the configuration information may contain filtering information to identify which notification events are to be provided to the user via the PTT service. This identifying or filtering information can take the form of user names or groups of usernames for which instant messages are to be delivered or blocked, email addresses allowed or blocked, message key word filtering, event type filtering, event time filtering or the like. For example, the user may identify that a certain user or group of users emails be delivered immediately to the PTT service, while all others are blocked. The user may further wish to configure notification event transmission, between 10 p.m. and 8 a.m. The user may want to receive messages from third parties such as sports scores or other information and may configure the system to allow such messages to be passed directly through the notification system to the user's PTT device.

The PTT configuration may contain additional filtering within the notification event information, such as which parts of the information the user wishes to include in an alert. For example, in an email, the user may specify that the user only wishes to know who the message is from (i.e. the "from" line), and to be read the first line (or multiple lines) of the message up to a specified size limit. One of average skill in the art will recognize that any number of filtering options for notification events of various types is possible.

In FIG. 2, the method begins when a user notification event is received from an online service provider at step 22. Once the event is received at step 22, in one embodiment the method can begin directly at step 31 to determine whether the user is PTT configured. In FIG. 2, one embodiment of the method begins with step 23 which is a check of the user's delivery preferences for the event. If the message is generated by an online service, the service may wish to present the user with a number of options on how the user may be notified. A user having both a messenger service such as MSN® messenger and the PTT service may configure preferences as to which service should have priority with respect to event delivery, or to try both forms of delivery for a given event. The preferences set at step 24 may be on a user wide level, or specific to the type of event, time of event, source of event or any other filterable characteristic of the event. At step 24, the method determines which delivery method is appropriate for the event.

If the preference for the event is for online delivery (via messenger), step 25 determines whether the user is online and accessible via a messenger service. If the user is online at step 25, the method may notify the user via the messenger service at step 26 and end the process at step 28. Alternatively, steps 25 and 26 may follow step 30 as discussed below.

If the user is not online, the method determines at step 27 whether it should try delivering the event via the PTT service. The outcome of step 27 will depend on whether the user configuration 23 indicates a PTT configuration is available, and whether a delivery attempt to the PTT service has been tried and failed (as a result of, for example, the delivery sequence discussed below).

If the preference at step 24 indicates a PTT delivery or if an online delivery fails and step 27 indicates a retry the system determines at step 31 whether the user is PTT configured. If the user is not PTT configured, the method ends at step 28. If the user is PTT configured, step 32 determines whether the notification event should be delivered based on the user's configuration information. If the user has set filtering such that the notification event should be blocked, the method ends at step 28. For example, if the user has chosen to block all emails from a specific individual, and receives an email from that individual, this step will block delivery of the message to the PTT interface. It will be recognized that the filtering described in step 32 can take place prior to generation of the notification event. That is, the configuration information for the use may block the generation event at step 22, eliminating the notification event generation.

If the user has a PTT configuration and the notification event should be delivered, the online service provider connects to the aggregation server at step 34 and delivers the content to the aggregation server. Once content has been delivered at step 34, the process can optionally end at step 28. Optionally, at step 40, the online service provider can wait for confirmation that the user has accessed the event by selecting the PTT button on the user's PTT enabled device. At step 44, the method will determine after a sufficient period of time whether the user has answered. If the user has answered, the method may end at step 28. If the user has not answered, a check of the user's PTT configuration settings will allow the method to determine whether or not to attempt to deliver the message again. In this case, the user may configure the system never to retry, or to retry at specific intervals and/or a specific number of times. If the user has configured a retry attempt, a timer may be initiated at step 48 to determine the interval between retry attempts and upon expiration of the timer, the method returns to step 32 to attempt to deliver the message again. Step 46 may further include implementing a counter to determine whether a sequential number of retry attempts has occurred, and if so, the determination at step 46 may be in the negative. If the configuration indicates at step 46 that no additional attempts to delivery should be made, or once the user answers at step 44 and the message is played to the user at step 45, the web service may be notified at step 47. If no delivery can be made at step 46, optionally, at step 29, the method determines whether it should attempt to deliver the message via a messenger service. Like step 27, the determination at step 29 will depend on whether the user configuration 23 indicates a messaging configuration, and whether a delivery attempt to the messaging service has been tried and failed (as a result of, for example, the delivery sequence discussed above).

Figure 3:
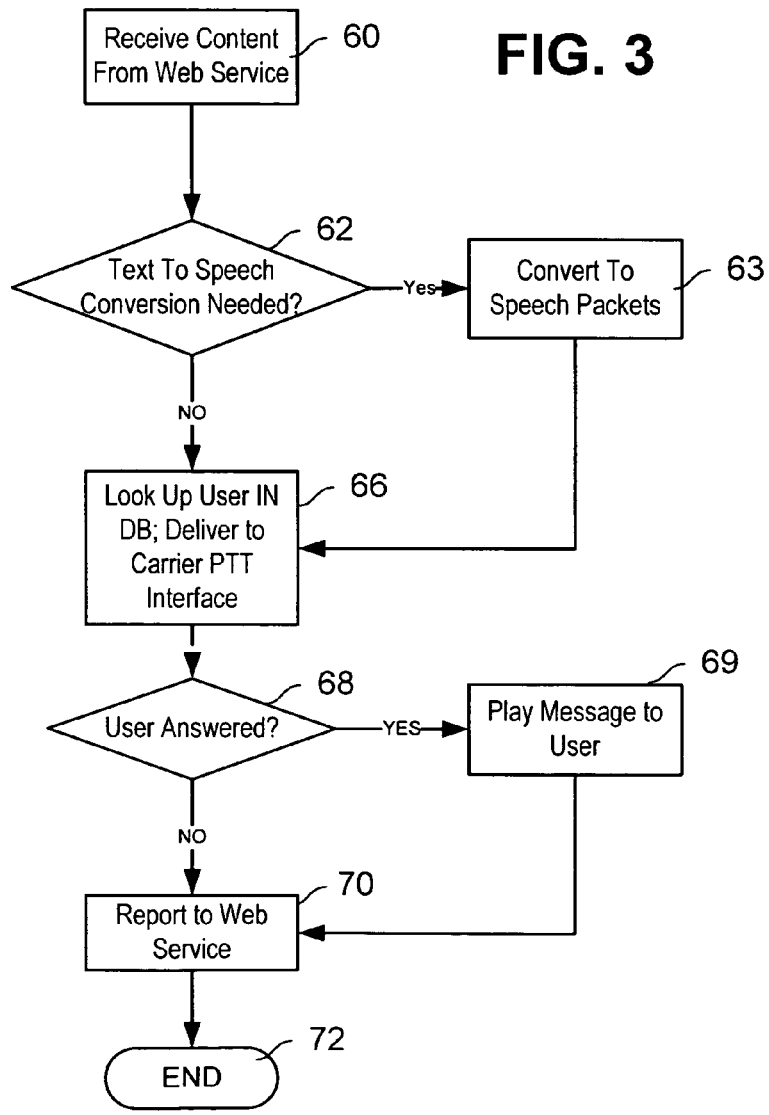
FIG. 3 is a flow chart illustrating a method performed by an aggregation server in accordance with the present invention.

FIG. 3 is a flowchart illustrating a method performed on the aggregation processor 12. At step 60, the aggregation processor will receive content from the online service provided at step 32 of FIG. 2. At step 62, the aggregation processor will determine whether text to speech conversion is needed. If so, at step 64 the information provided by the online service provider will be converted into audio information. If not, at step 66 the aggregation processor uses the user PTT configuration information to determine how to contact the PTT carrier API. Step 66 includes looking up user information in a contact mapping database and determining the PTT connection information for the particular carrier which is to be provided to the carrier API in order to address the user's PTT network enabled device. This may include, for example, how to route information to the interface, what protocol to use in sending information to the interface, and how to identify the user to the interface. Once this is determined, the information will be delivered to the PTT carrier API at step 66. The API will then send the message using the carrier's PTT network.

When a user receives notification of a PTT message, the user will generally receive a beep or other sensory notification on the user's phone. The user can choose to accept the notification and listen to the message, or the user can choose to ignore it. Based on the configuration described above the system will either retry to send the message or it will abandon the attempt to contact the user.

At step 68, the aggregation processor can wait for confirmation from the carrier API that the user has answered the PTT call and the message has been played to the user at step 69. If the user has not answered or if the user has answered at step 68, then at step 70, the method can report this information to the online service (step 44 of FIG. 2). Following step 70, the aggregation service process with respect to this particular message ends.

Figure 4:
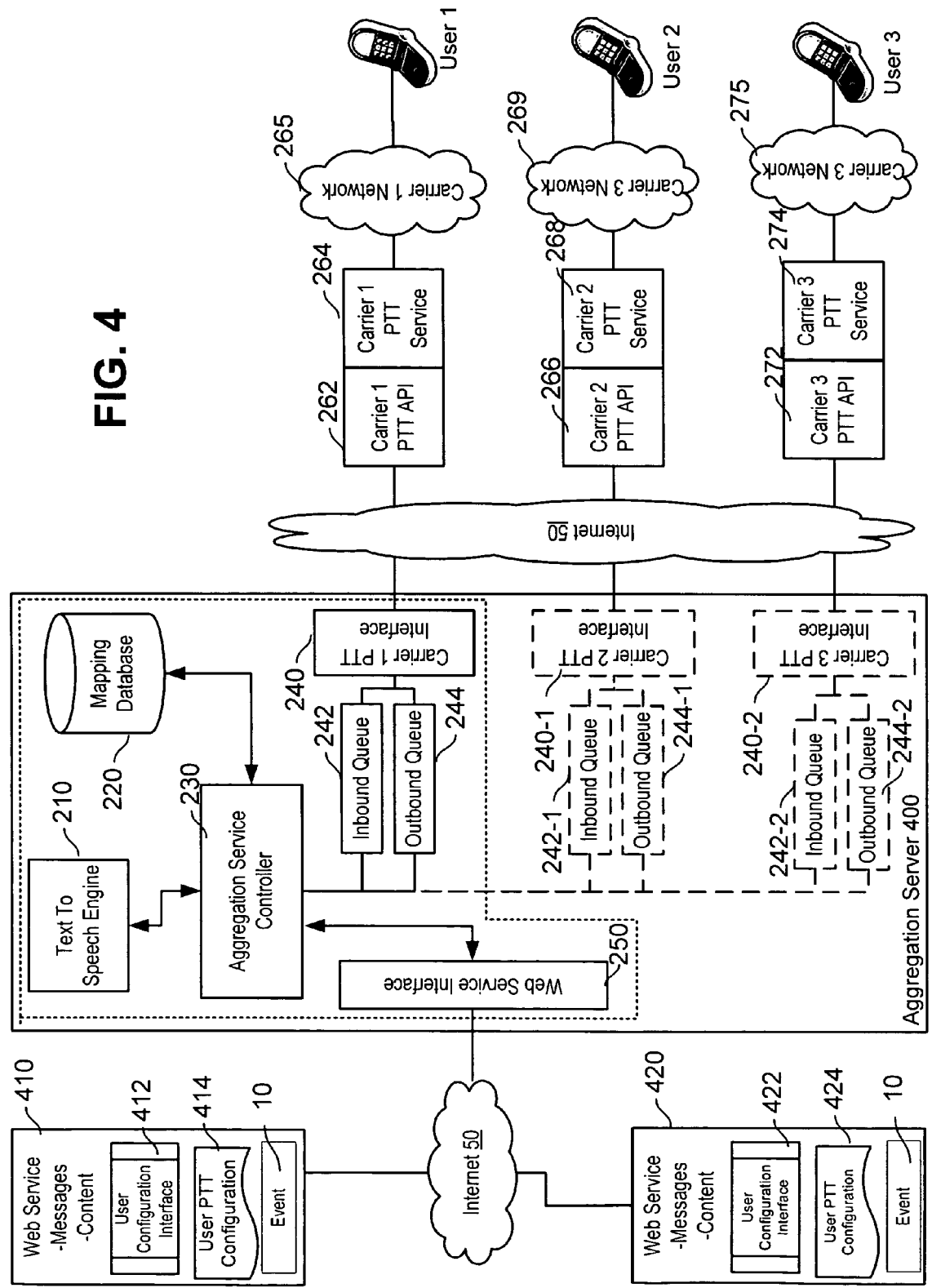
FIG. 4 is a block diagram of a first system utilizing an aggregation server in accordance with the present invention.

FIG. 4 is a block diagram of a first system utilizing the aggregation processor in accordance with the present invention. FIG. 4 shows an aggregation server 400 which includes a text-to-speech engine 210, a mapping database 220, an aggregation service controller 230, a online service interface 250, an inbound message queue 242, an outgoing message queue 244, and a carrier PTT interface 240. Elements 200 comprise a basic aggregation server 400, requiring only one carrier message queue and interface. Aggregation server 400 may further include additional carrier interfaces 240-1 and 240-2, as well as corresponding inbound queues 242-1, 242-2 and outbound queues 244-1 and 244-2 for any number of additional carriers. The online service interface connects via a network such at internet 50 to online service providers 410, 420 each of which having user configuration interfaces 412, 422 which allow to their respective users to create user PTT configurations 414 and 424. Each online service may provide notification events 10 through the network 50 to the online service interface 250. Online service interface 250 translates the events from the particular format provided by the online service and provides it to the aggregation service controller. Text to speech engine 210 performs text to speech conversion in accordance with well known techniques. Mapping database 220 contains user specific identification information which may identify, for example, the carrier specific identification information for online service users, allowing the aggregation server 400 to address the user's PTT enabled device. Each notification event, once in audio format, is then provided by the aggregation service controller 230 to an outbound queue 244 which queues messages for each individual carrier (carrier 1, carrier 2, or carrier 3). Events are queued by user until each carrier API is ready to receive the message.

Messages in the outbound queues 242, 242-1, 242-2 are provided to the carrier interface 240 which transmits these messages via a network such as internet 50 to a carrier specific PTT application programming interface such as interface 262. FIG. 4 shows three specific carriers, carrier 1, carrier 2, carrier 3, each having a specific carrier PTT API 262, 266, 272, and carrier specific PTT service 264, 268, 274 with a carrier specific network 265, 275, 285 connecting to individual users. The carrier specific API is a connector to the carrier's PTT service such as carrier 1 PTT service 264. The PTT service carrier 264 will determine the location and availability of the user and transmit the message via the carrier specific network such as carrier network 265 to the user 20. It will be recognized that the aggregation server 400 may have any number of different carrier interfaces and mapping database 220 may contain information for any number of different carriers and carrier networks. It will be further recognized that the carrier networks and carrier services need not be wireless or cellular networks, but may be any network enabled PTT service including, for example, messenger enabled PTT services for given users.

If a user chooses to respond to the message by, for example, pressing a communication button on the user's PTT enabled device, the message is routed back via the carrier network to the respective inbound message queue and, if possible, to the originating online service. For example, if a user is responding to an email, the user's PTT enabled device can generate an inbound message on the device which may be converted to voice over IP or another standard audio format, and returned to the online system for routing to the original the original email sender.

Figure 5:
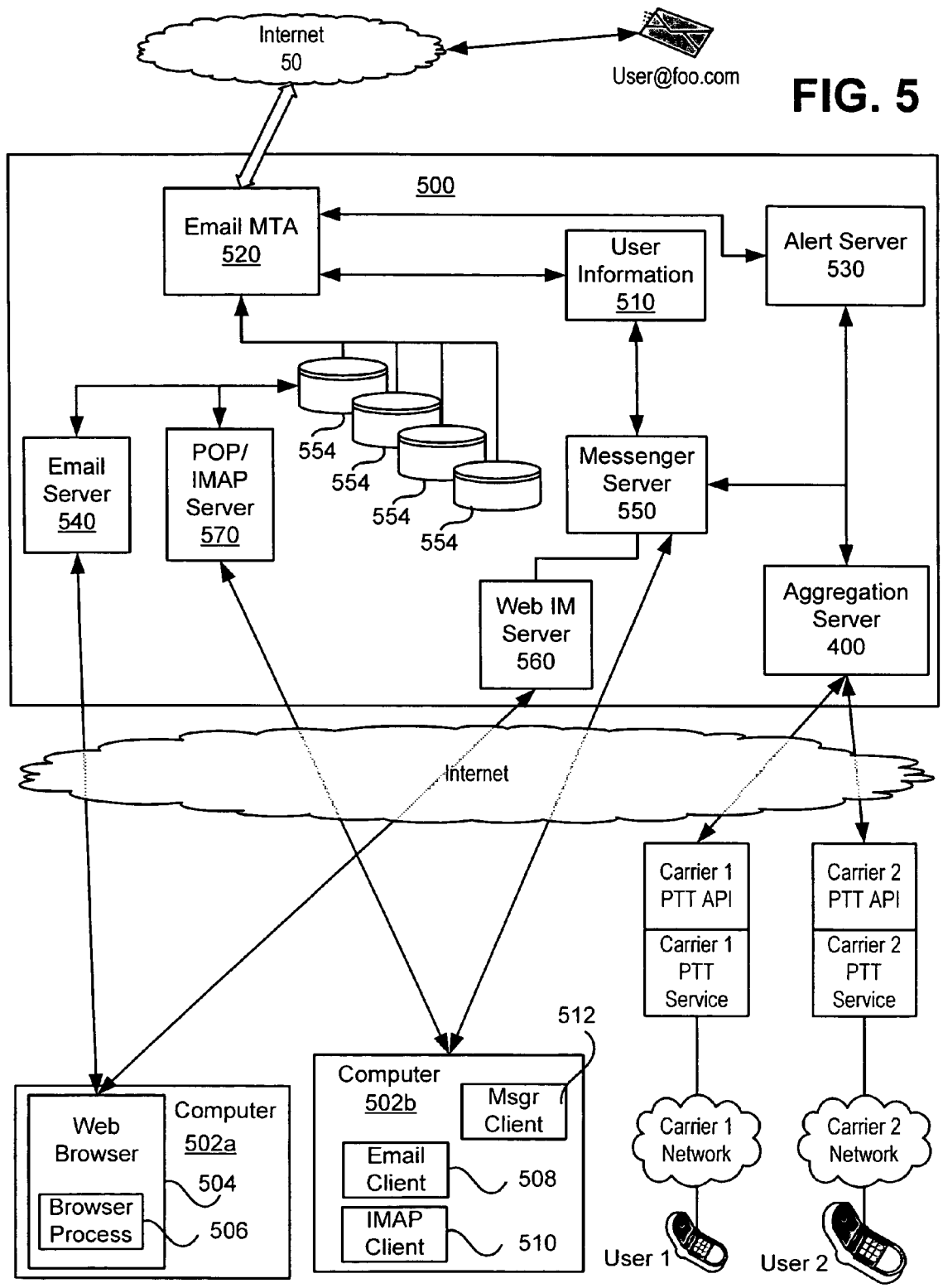
FIG. 5 is a block diagram of a second system utilizing an aggregation server in accordance with the present invention.

FIG. 5 is a block diagram illustrating another embodiment of the system of the wherein an aggregation server is integrated with an online service provider system 500. FIG. 5 illustrates service provider system 500 which may be operated by an enterprise service provider such as MSN®, Yahoo®, AOL®, or other online service providers. System 500 is comprised of a plurality of computing devices maintained by an enterprise service provider. In one embodiment, it may consist of, for example, a message transfer agent (MTA) 520, a user information database server 510, user mail storage units 554, an email server 540, a POP/IMAP server 570, an alert server 530, a messaging server 550, a web integrated messaging server 560, an aggregation server such as aggregation server 400.

System 500 allows users operating processing devices 502a and 502b to access email, messenger, and other data, and forward outbound messages and messaging information to users within the domain of system 500 and domains accessible via the internet 50. Users may connect to the system 500 via any number of public or private networks including the Internet. The user database server 510 stores information allowing users to authenticate themselves to system 500 to access their email and internet messaging, and to allow other servers in the system to direct mail and messages within the system to storage locations on storage units 554. Email server 540 may comprise a web server which provides an email interface to a web browser 508 which institutes a browser process 506 on the user computer 502a. Email server 540 can render email data from the data storage units to a user using computer 502a to access the email system 500. Likewise POP/IMAP server 570 can provide email data to a POP e-mail client 518 or an IMAP client 510 on user computer 502b.

Messenger server 550 can provide information directly to a messenger client 512 or via a web internet messaging server 560 to web based messenger clients operating in a browser process 506 and web browser 504.

Inbound and outbound email messages from users on computers 502a and 502b are sent and received in system 500 via the MTA 520. Email MTA 520 generally uses SMTP to route mail via the internet 50 to users at other internet accessible domains. E-mail MTA 520 is a front-end server to which emails 590 transmitted via the internet to system 500 are directed and which forwarded messages from users of the messaging system 500 to other users on the internet 50. It should be understood that a web based enterprise service provider environment, a number of email MTAs 520 will be present.

The user database server 510 is a data store of user account and storage location information for each of the users having a user account or email address within system 500. The user information 510 may include the PTT configuration information 414, 424 accessed via the user configuration interface by the user. Storage units 554 are essentially large disk arrays storing user message information. The system may include additional components not shown here for the convenience in understanding the present invention.

In one embodiment, an alert server 430 interacts with the e-mail MTA 520 and messenger server 550 to perform the event generation step 22 of FIG. 2 based on receipt of an email, message, or generation of a user event recorded by the user and stored in the user information 510, or the receipt of a messenger message by messenger server 550. When the alert server 530 generates the notification event, it can connect with the messenger server to perform steps 24 and 26 of FIG. 2, and the aggregation server 400 to perform the balance of the method of FIG. 2 as discussed above. In the embodiment of FIG. 5, the online service interface present in aggregation server 400 will talk directly to the messenger and alert server to receive data from the email server and messenger server (and any other content servers) which are present in the system and provide them via the carrier interface to the carrier APIs as shown in FIG. 5.

Figure 6:
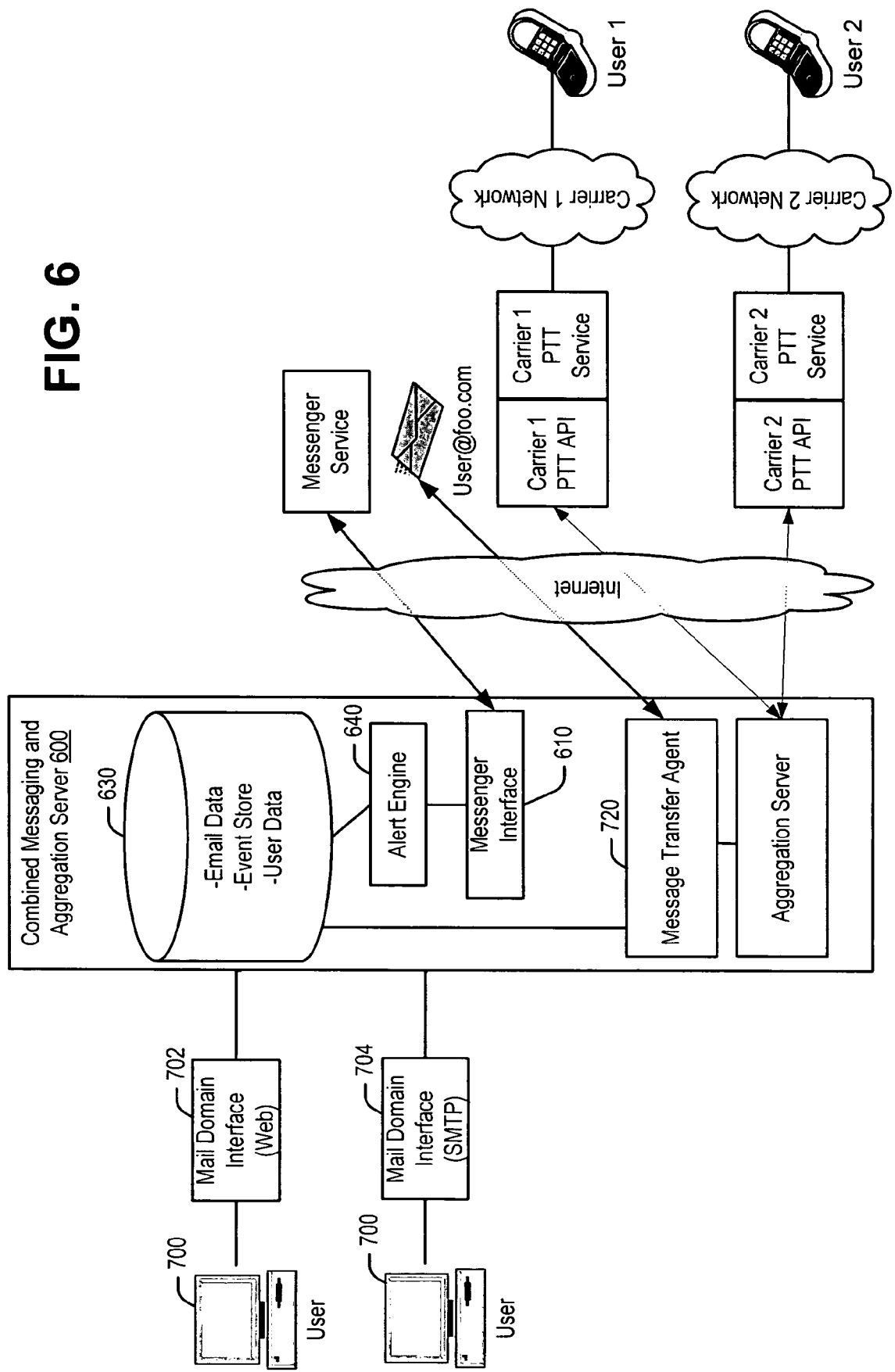
FIG. 6 is a block diagram of a combined messaging and aggregation server implementing aspects of the present invention.

FIG. 6 shows in another alternative of the aggregation processor. In FIG. 6, an aggregation processor 600 may be combined with a messaging server, such as Microsoft Exchange 2003 server, and operated on one or more processing devices. A combined messaging and aggregation server 600 includes a data store 630 which may include user data stores comprising email data, event stores, contact information, task information, and other events stored in a user centric fashion. An alert engine 640 communicates with the data store 630 to generate and activate user notification events based on user specified criteria. A messenger interface 610 may be provided to interact with an Internet based messenger service 650 such as service provided by system 500 of FIG. 5. Users can interact with message server 600 via processing devices 700 and a domain interface based on a web browser 702 or an SMTP connection 704. Messages received by the message transfer agent 720 are provided to the data store based on the settings of the aggregation server 400 can be output to the respective carriers as in the embodiments discussed above.

Figure 7:
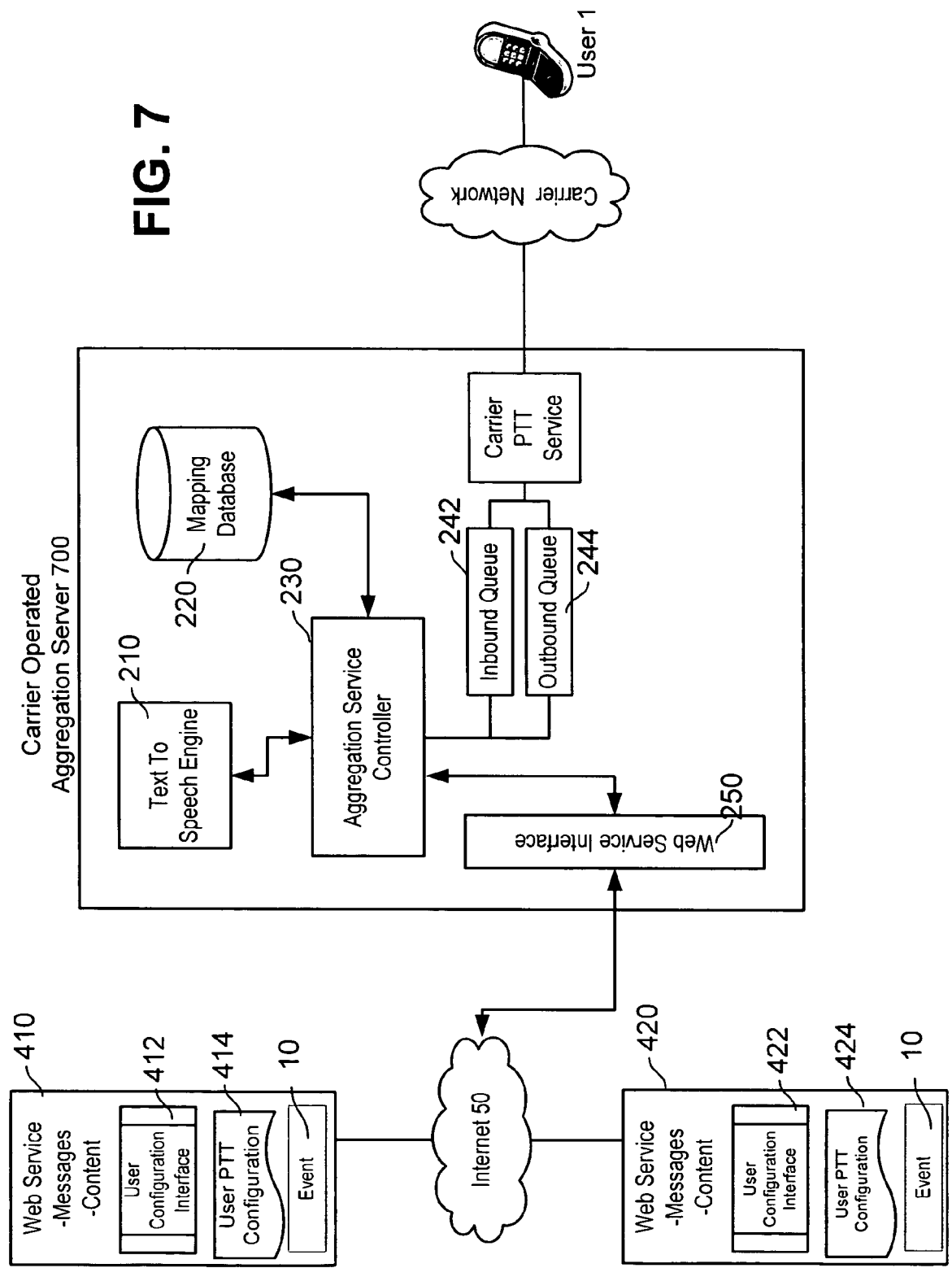
FIG. 7 is a block diagram of a carrier operated aggregation server implementing aspects of the present invention.

FIG. 7 shows yet another alternative embodiment of the aggregation processor wherein an aggregation server 700 may be operated by a PTT carrier. In a carrier based embodiment, the carrier interface (such as interface 240) and carrier API (such as API 262) need not be provided. In this embodiment, the PTT carrier is in control of the web service interface 250 and can enable conversion directly to the format required by the PTT carrier network and service. The aggregation service controller can provide messages to the outbound queues in a format suitable for the PTT service of the carrier. Messages may be directed via the carrier service directly over the carrier network to the user in a format which the user's PTT enabled device can understand. In this embodiment, the event information is shown as being from the online service providers 410 and 420, however, it should be understood that the aggregation server 700 of FIG. 7 can be combined and integrated into the system 500 of FIG. 5 so that the online service interface is actually interacting with a single source of information provided by an online service provider.

It should be recognized that any of the above embodiments need not be provided via a voice over cellular network. In addition, it should be recognized that the online service provider is the initiator of the service. In one case, the online service provider can provide the configuration interfaces to the user. In an alternative configuration, the operator of the aggregation processor may be a separate entity from the online service provider and may provide interfaces to the online service provider to gather and maintain the contact information for the PTT service of the user. It will be further understood that the text to speech technology utilized herein is standard on many Microsoft Exchange 2003 servers currently.

Figure 8:
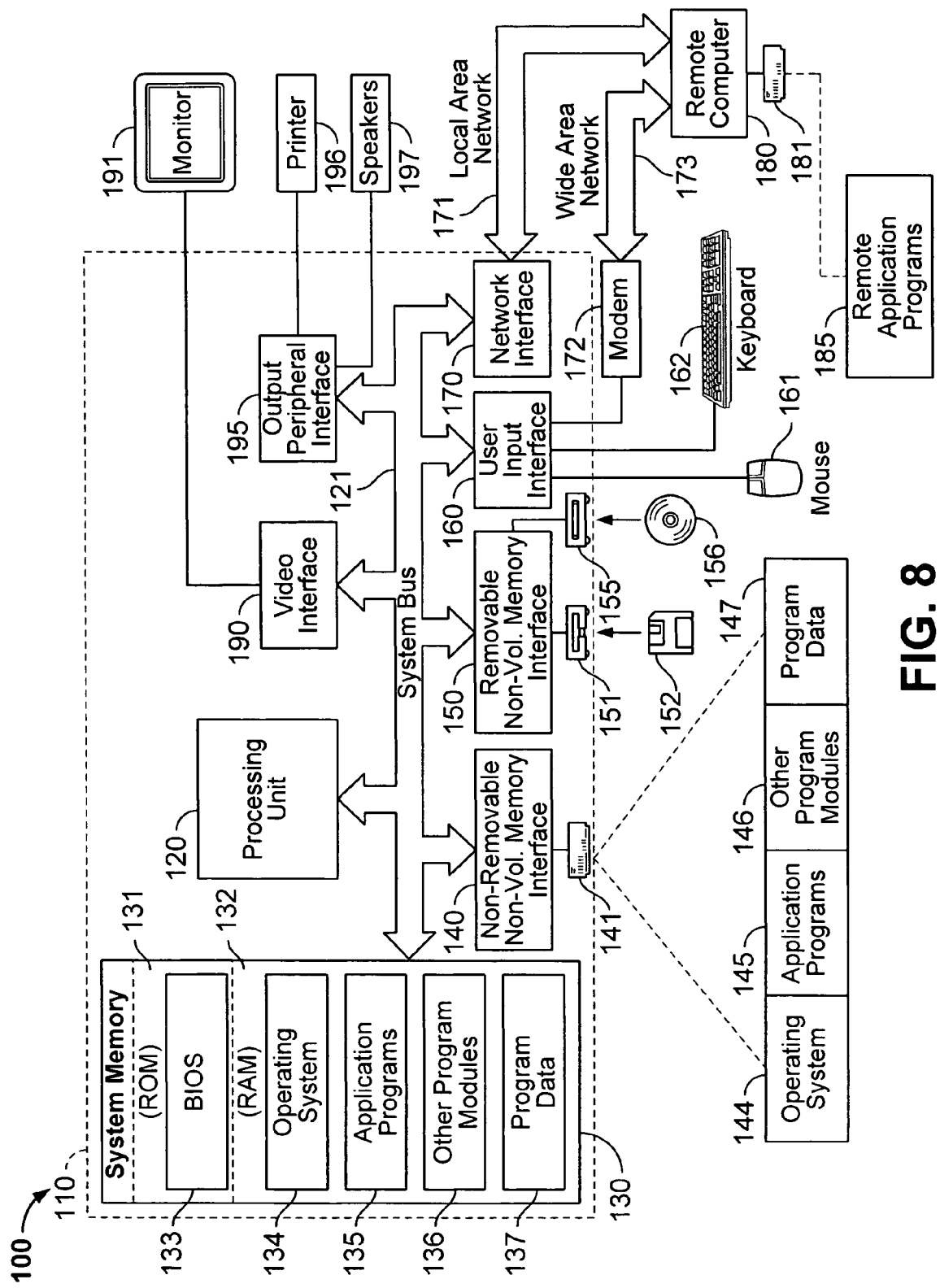
FIG. 8 is a block diagram of a processing device suitable for use as any of the processing devices identified in accordance with the present invention.

FIG. 8 illustrates an example of a suitable computing system environment 100 which may comprise any of the processing devices described herein on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 110 may also include other removable/non-removable, volatile/nonvolatile computer storage media. By way of example only, FIG. 18 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for notifying a user of an event, comprising:
   receiving an identifier of a push-to-talk (PTT) carrier and information for addressing a user's PTT enabled device via the PTT carrier, the identifier and information received by an online service that generates event data for users having accounts with the online service;
   receiving, by the online service, a request from the user to forward event data to the user via the PTT carrier if the user is not available online, the request describing what portion of the event data is to be forwarded to the user via the PTT carrier, the portion being less than the entire event data;
   receiving event data to be provided to the user from the online service, the event data is received at an event data processor;
   determining whether the user is online to receive the event data via the online service;
   delivering the entire event data to the user online via the online service if the user is online;
   if the user is not online, performing the substeps of:
      filtering the event data to determine which portions of the event data to provide to the user, the portions comprising less than the entire event data, the filtering is based on the stored description of what portion of the event data is to be forwarded to the user via the PTT carrier;
      creating a message configured to comply with a PTT format associated with the PTT carrier for the user;
      determining how to provide the message to the PTT carrier associated with the user based on the received PTT identifier and the information for addressing the user's PTT enabled device via the PTT carrier; and
      providing the message with the filtered event data and the information for addressing the user's PTT enabled device via the PTT carrier to the PTT carrier based on the PTT format, the message is provided from the event data processor to the PTT carrier to be delivered to the user's PTT enabled device without the PTT enabled device having a session maintained with the event data processor.

2. The method of claim 1 wherein the event data includes text data, and the method further includes the step of converting the text data to audio information for the user.

3. The method of claim 1 wherein the method further includes:
   receiving a response from the push-to-talk carrier indicating whether or not the message was not played at the push-to-talk enabled device; and
   reporting to the online service that the message was delivered to but not played at the push-to-talk enabled device.

4. The method of claim 3 wherein the response comprises one of a voice packet or text response.

5. The method of claim 3 wherein the step of determining how to provide the message to the PTT carrier includes associating the (PTT) carrier identifier with a communication interface for the PTT carrier, the push-to-talk format including a protocol, the message configured to comply with the protocol for the push-to-talk carrier.

6. The method of claim 1 wherein the method further includes receiving event data from at least two online service providers.

7. The method of claim 1 wherein the method further includes providing event data to at least two different users, each user associated with a different PTT carrier.

8. The method of claim 1 wherein the method further includes the step of determining whether user data provided by said providing step has been accessed by the user.

9. The method of claim 1 wherein the event data is one of an email message, a calendar reminder, an instant message, a voice message, or voice over IP data.

10. The method of claim 1, further comprising receiving user identifier information from the online service; wherein the determining a push-to-talk carrier associated with the user includes mapping the user identifier information to the push-to-talk carrier associated with the user.

11. A notification event server, comprising:
   an aggregation service controller;
   a text to speech converter;
   an online service interface that receives notification events from at least one online service provider, the notification events including event data, the online service interface receives first user identification information for a first user that is to be sent a first notification event of the notification events;
   an interface for receiving push-to-talk (PTT) configuration information, the PTT configuration information for the first user including an identifier of a PTT carrier for the first user, information for addressing the first user's PTT client via the identified PTT carrier, and a description of what portion of the event data for the notification events is to be forwarded to the first user via the PTT carrier, the portion being less than the entire event data for the notification events;
   a user PTT connection mapping database which contains information that allows the notification event server to forward event notifications to the user's PTT client without the PTT client being logged in to the notification event server;
   a controller that determines whether the first notification event should be delivered to the user via the online service, the online service interface delivers the first notification event to the user via the online service if the first notification is to be sent via the online service, the controller accesses the mapping database to determine how to provide the first notification event to the PTT carrier associated with the user and to determine how to create a message that contains the first notification event if the first notification event should not be delivered to the user via the online service, the message contains less than all of the event data for the first notification event; and
   a PTT service provider interface that delivers the message containing the first notification event to the user based-on the first PTT carrier information if the first notification event should not be delivered to the user via the online service.

12. The server of claim 11 further including a carrier inbound message queue and a carrier outbound message queue.

13. The server of claim 11 wherein the connection mapping database includes routing information to a PTT carrier service.

14. The server of claim 11 wherein the text to speech converter includes two or more language options selectable by a user.

15. A method for providing an online service, comprising:
   providing an online service generating events for users having accounts with the online service;
   maintaining a push-to-talk (PTT) configuration including carrier information for at least one of the users having accounts with the online service, the carrier information is received from the online service and stored at an event message processor, the carrier information allows event notifications to be forwarded from the event message processor to a PTT client without the push-to-talk client having an active session with the event message processor or being logged in to the event message processor, the carrier information identifies a PTT provider that the PTT client subscribes to and includes information for addressing the PTT client via the PTT carrier, PTT configuration further includes a description of what portion of a event data is to be forwarded to the PTT client via the PTT provider, the portion being less than the entire event data;
   generating a notification event for said at least one user, the notification event is described by event data;
   determining whether the notification event should be delivered to the at least one user via the online service;
   delivering the notification event to the at least one user via the online service if it is determined that the notification should be delivered via the online service;
   if it is determined that the notification event should not be delivered to the at least one user via the online service, performing the substeps of:
      determining that the notification event should be delivered through a PTT client for said at least one user;
      filtering the event data to determine which portions of the event data to provide to the PTT client for said at least one user, the filtering is based on the description of what portion of the event data is to be forwarded to the PTT client via the PTT provider, the portion being less than the entire event data;
      generating a message with user identification information for the at least one user and the portions of the event data that are to be provided for the notification event, the message configured to comply with a protocol for the PTT carrier identified in the PTT configuration for said at least one user;
      outputting the message having the portions of the event data that are to be provided for the notification event and user identification information to the PTT client for said at least one user via a carrier identified in the carrier information.

16. The method of claim 15 wherein the method further includes outputting the portions of the event data that are to be provided for the notification event to an aggregation interface between the online service and the carrier.

17. The method of claim 15 wherein the method further includes notifying an event data sender whether the user has received the message data.

18. The method of claim 15 wherein the method further includes maintaining event filtering information indicating which events are to be delivered to the user.

* * * * *